(12) United States Patent
Johnstone et al.

(10) Patent No.: US 6,897,962 B2
(45) Date of Patent: May 24, 2005

(54) INTERFEROMETER USING BEAM RE-TRACING TO ELIMINATE BEAM WALK-OFF

(75) Inventors: Eric S. Johnstone, Redwood City, CA (US); John J. Bockman, Santa Clara, CA (US); Alan B. Ray, Palo Alto, CA (US); Kerry Bagwell, Campbell, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 377 days.

(21) Appl. No.: 10/126,002

(22) Filed: Apr. 18, 2002

(65) Prior Publication Data

US 2003/0197869 A1 Oct. 23, 2003

(51) Int. Cl.⁷ .................................................. G01B 9/02
(52) U.S. Cl. ........................................ 356/493; 356/487
(58) Field of Search ................................ 356/486, 487, 356/493, 498, 500, 516

(56) References Cited

U.S. PATENT DOCUMENTS

| | | |
|---|---|---|
| 4,711,574 A | 12/1987 | Baldwin |
| 4,784,489 A | 11/1988 | Cutler et al. |
| 4,784,490 A | 11/1988 | Wayne |
| 4,930,894 A | 6/1990 | Baldwin |
| 5,064,289 A | 11/1991 | Bockman |
| 5,677,768 A | 10/1997 | Bockman |
| 6,014,216 A | 1/2000 | Zorbedian |
| 6,020,964 A * | 2/2000 | Loopstra et al. ............ 356/500 |
| 6,313,918 B1 | 11/2001 | Hill et al. |
| 6,762,845 B2 | 7/2004 | Hill |

OTHER PUBLICATIONS

Agilent Technologies, Inc., "Laser and Optics User Manual", Aug. 2000.

* cited by examiner

Primary Examiner—Samuel A. Turner (57) ABSTRACT

An interferometer returns parallel beams that are subject to walk-off caused by reflector misalignment for an additional pass through the interferometer optics and thereby eliminates beam walk-off. A return reflector can be a plane mirror that directs returning beams to retrace paths through the interferometer optics to combine and exit along the axis of the input beam. Separation optics can separate the combined beam from the input beam. Alternatively, a return reflector such as an isosceles prism or a trapezoidal prism reflects and offsets returning beams so that the combined beam is offset from the input beam. The return reflector more generally responds to a shift in incident beam position with a matching shift of the reflected beam in contrast to a retroreflector, which shifts a reflected beam in a direction opposite to the shift in the incident beam.

33 Claims, 6 Drawing Sheets

INTERFEROMETER USING BEAM RE-TRACING TO ELIMINATE BEAM WALK-OFF

BACKGROUND

Interferometers commonly use polarization encoding to distinguish reference beams from measurement beams. In a plane-mirror interferometer 100 illustrated in FIG. 1, for example, an input beam IN contains two linearly polarized components having orthogonal linear polarizations. A polarizing beam splitter 110 in interferometer 100 separates the two components creating a reference beam and a measurement beam.

Figure 1:
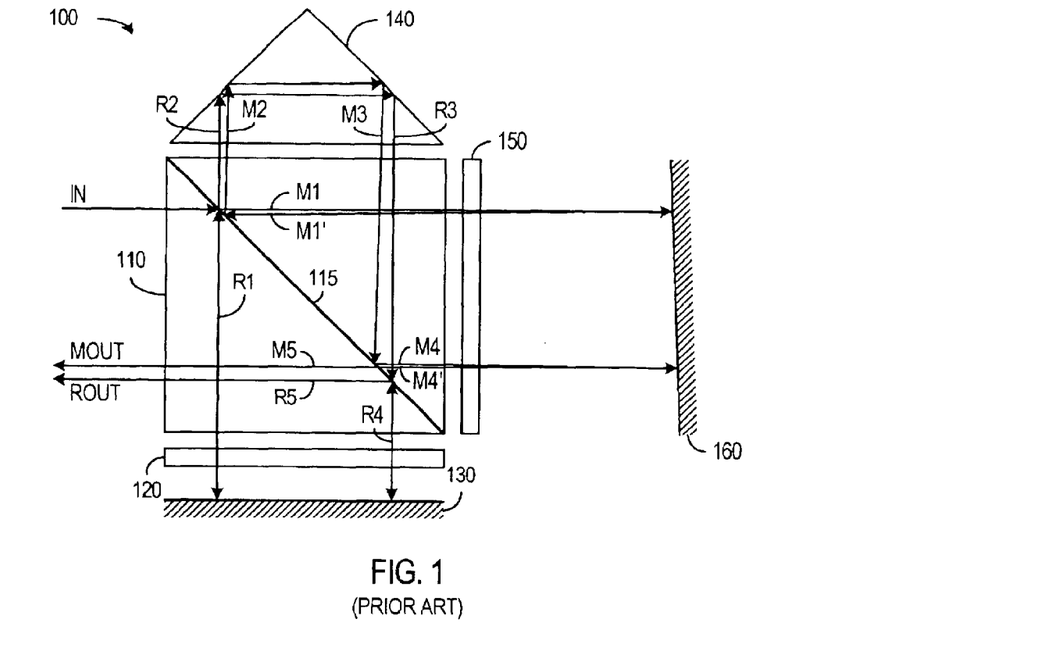
FIG. 1 illustrates a conventional interferometer having a misaligned measurement mirror that causes beam walk-off.

In FIG. 1, polarizing beam splitter 110 reflects the component corresponding to the reference beam. The reference beam thus travels down a path R1 through a quarter-wave plate 120 to a reference mirror 130. Reference mirror 130 has a fixed mounting relative to polarizing beam splitter 110 and is aligned perpendicular to path R1 so that the reference beam reflects from a reference mirror 130 and travels back through quarter-wave plate 120 along path R1. Passing twice through quarter-wave plate 120 effectively rotates the polarization of the reference beam by 90° so that the reference beam returning on path R1 passes through polarizing beam splitter 110 and enters a cube comer reflector 140 along a path R2.

Cube comer reflector 140 reflects the reference beam onto an offset path R3, and the reference beam traverses polarizing beam splitter 110 directly to a collinear path R4. The reference beam then continues along a path R4 through quarter-wave plate 120 before again reflecting from reference mirror 130 and returning through quarter-wave plate 120 along path R4. The second pair of trips through quarter-wave plate 120 changes the polarization of the reference beam, so that polarizing beam splitter 110 reflects the reference beam from path R4 onto an output path ROUT.

Polarizing beam splitter 110 of FIG. 1 transmits the input polarization component corresponding to the measurement beam so that the measurement beam travels along a path M1 through a quarter-wave plate 150 to a measurement mirror 160. Measurement mirror 160 is on an object such as a translation stage in processing equipment for integrated circuit fabrication. Measurement mirror 160 is ideally perpendicular to path M1, but generally, measurement mirror 160 may have an angular orientation that is subject to variations as the object moves. FIG. 1 shows a configuration where measurement mirror 160 has a non-zero yaw angle relative to path M1. As a result, the measurement beam reflected from measurement mirror 160 returns along a path M1' that forms a non-zero angle (i.e., twice the yaw angle) with path M1.

The measurement beam, which passed twice through quarter-wave plate 150, had its linear polarization rotated by 90°, so that polarizing beam splitter 110 reflects the measurement beam from path M1' to a path M2 into cube corner 140. From cube corner 140, the measurement beam travels path M3, reflects in polarizing beam splitter 110 to a path M4 through quarter-wave plate 150 to measurement reflector 160. The measurement beam then returns from measurement reflector along a path M4' through quarter-wave plate 150. Path M4' forms an angle with path M4 according to the orientation of measurement mirror 160 and is parallel to path M1. Polarizing beam splitter 110 transmits the measurement beam from path M4' to an output path MOUT.

Interferometer electronics (not shown) can analyze phase information from a combination of the reference and measurement beams to measure movement of measurement mirror 160. In particular, a combined beam resulting from combining the reference and measurement beams can be made to interfere to produce a measurement signal. Each reflection of the measurement beam from measurement mirror 160 when measurement mirror 160 is moving along the direction of the measurement beam causes a Doppler shift in the frequency of the measurement beam and a corresponding change in the beat frequency of the combined beam. In a DC interferometer where the measurement and reference beams initially have the same frequency, the beat frequency of the combined beam corresponds to the Doppler shift. In an AC interferometer where the measurement and reference beams initially have slightly different frequencies, the change in the beat frequency indicates the Doppler shift.

AC interferometers typically use an input beam having orthogonal, linear polarization components with slightly different frequencies. Imperfect polarization separation of the frequency components of the input beam can cause cyclic errors in the Doppler shift measurement. If the reference beam, for example, contains some light at the frequency intended for the measurement beam, the reference beam by itself gives rise to an error signal having the beat frequency depending on the frequencies of the input components. If the error signal becomes too large when compared to the measurement signal accurate measurements become difficult. Accordingly, maximizing the measurement signal is important for accurate measurements.

Maximizing the measurement signal for AC or DC interferometers requires efficient combination of the measurement and reference beams, and combination of the reference and measurement beams is most efficient when the output paths ROUT and MOUT for the reference and measurement beams are collinear. Achieving collinear output beams from interferometer 100 depends on proper alignment of reference mirror 130 and measurement mirror 160.

In the properly aligned configuration, measurement mirror 160 is perpendicular to path M1, and reflected paths M1' and M4' are collinear with incident paths M1 and M4. As a result, measurement paths M2, M3, and MOUT respectively coincide with reference paths R2, R3, and ROUT when measurement mirror 160 is ideally aligned. If measurement mirror 160 is out of alignment, paths M1 and M1' form an angle that depends on the misalignment of measurement mirror 160, and the reference and measurement paths are skewed relative to each other. The angular misalignment or angular difference between the measurement and reference paths continues until the second reflection from measurement mirror 160 at which point measurement path M4' and output path MOUT become parallel to the output path ROUT for the reference beam. However, the angular variation of measurement mirror 160 still displaces the measurement beam output path MOUT relative to the reference beam output path ROUT. This phenomenon is commonly referred to as beam walk-off.

When the beam walk-off is negligible compared to the diameters for the reference and measurement beams, the combined beam provides a strong measurement signal. However, a misalignment of measurement mirror 160 by about 0.001 radians or more in concert with a large distance (on the order of 0.5 meters or more) between beam splitter 110 and mirror 160 in some precision interferometers causes a walk-off that is a significant fraction of the beam diameters. (The walk-off in a plane-mirror interferometer is generally about $4 L\alpha$, where L is the distance between the interferometer and measurement mirror 160 and $\alpha$ is the angular misalignment of measurement mirror 160.) The resulting decrease in the overlapped area of the measurement and reference beams causes a significant drop off in the measurement signal, making the cyclic error signal more significant and making accurate measurements difficult.

Another problem arising from beam walk-off is the dynamic range of measurement signal during operation of interferometer 100. In particular, the light intensity in the overlapped beam can vary from a best case having a maximum overlap to a worst-case have a relatively small overlap. The intensity of the measurement signal thus depends on the alignment of measurement mirror 160, and the alignment changes during operation of interferometer 100, particularly when the object being measured moves. The input beam must have sufficient power to provide a measurable signal in the worst-case alignment, which significantly reduces energy efficiency of interferometer 100. Additionally, the optical receiver and measurement electronics must have a dynamic range sufficient to handle both the worst case low measurement signal levels and best case high measurement signal levels.

Yet another drawback of beam walk-off arises from non-uniformity of the wave fronts of the beams. Typically, beam curvature, wedge angles, and aberrations of the beams themselves and optical surfaces traversed by one beam but not by the other can cause wave front phase differences. Measurement beam walk-off can change the overlap and specifically cause the measured phase of the signal to change even if the distance between mirror 160 and beam splitter 110 did not change.

Interferometer 100 employs cube corner reflector 140 to redirect the reference and measurement beams for additional reflections from respective plane-mirror reflectors 130 and 160. As noted above, cube corner reflector 140 and the additional reflections avoid angular separations between output beam paths ROUT and MOUT. The additional reflections also increase (i.e., double) the Doppler shift of the measurement beam and can increase the measurement resolution of the interferometer. A further cube corner reflector might be added to further increase the number of reflections of the measurement beam from measurement reflector 160 (and the number of reflections of the reference beam from the reference reflector 130). A shortcoming of using a cube corner reflector is the resulting increase in the beam walk-off (e.g., doubling beam walk-off when doubling the number of reflections).

A dynamic beam steering system could measure the relative position of the measurement and reference beams during operation of interferometer 100 and then dynamically adjust reference mirror 130 or another optical element in interferometer 100 to minimize the walk-off. Such dynamic steering systems tend to be complex, expensive, and vulnerable to failure. Accordingly, more efficient and less complex systems and methods for reducing or eliminating walk-off are desired.

SUMMARY

In accordance with an aspect of the invention, an interferometer returns measurement and reference beams for an additional pass through the interferometer optics along paths that either retrace a first pass through the interferometer optics or follow paths parallel to the first pass. As a result, additional reflections of the measurement and reference beams from their respective reflectors eliminate walk-off between measurement and reference beams in a final combined beam.

In one embodiment, a plane mirror return reflector directs parallel beams that have passed once through an interferometer back into the interferometer so that the second pass of the beams through the interferometer retraces the first pass. The resulting output reference and measurement beams are thus collinear and along the axis of the original input beam. A separating system can separate the combined output beam from the axis of the input beam.

To avoid having input and output beams on the same axis, another embodiment of the invention uses a return reflector that offsets the reference and measurement beams that are returned for the second pass through the interferometer. An isosceles or trapezoidal prism, either of which may be truncated for manufacturing or other reasons, can perform this type of reflection. The returned beams follow paths that are parallel to but offset from the paths followed for the first pass. The final output reference and measurement beams are offset from the input beam and collinear with each other.

One specific embodiment of the invention is an interferometer including a beam splitter, first and second reflector systems, and a return reflector. The beam splitter splits an input beam typically according to polarization into a first beam and a second beam, e.g., a measurement beam and a reference beam. The first reflector system, which can include a plane mirror or a retroreflector, receives the first beam from the beam splitter and reflects the first beam back to the beam splitter. The second reflector system, which includes a reflector of the same type as the first reflector system, receives the second beam from the beam splitter and reflects the second beam back to the beam splitter.

In a plane mirror interferometer, which may be a differential interferometer or an interferometer having fixed internal reference path, each of the first and second reflector systems typically includes a plane mirror and a quarter-wave plate, and the interferometer further employs a retroreflector. With the retroreflector, the first beam follows a path including two reflections from the first reflector system before reaching the return reflector. The retroreflector between the two reflections in the interferometer eliminates the effect that angular misalignment of the first reflector system has on the direction of the first beam, but the position of the first beam is still subject to variations that depend on the misalignment of and the distance to the first reflector system. Similarly, the second beam follows a path including two reflections from the second reflector system before reaching the return reflector, which results in the second beam having the desired direction but a position that depends on the alignment of and the distance to the second reflector system.

In a linear interferometer, each of the first and second reflector systems typically includes a retroreflector. The first beam reflects from the retroreflector in the first reflector system once before reaching the return reflector, and the second beam reflects from the retroreflector in the first reflector system once before reaching the return reflector. Using retroreflectors keeps the beams traveling in the desired directions but does not eliminate walk-off resulting from linear and angular misalignment of the retroreflectors.

The beam splitter forms a first combined beam from the first and second beams and directs the combined beam to the return reflector. The first and second beams in the first combined beam are parallel to each other but walked-off from each other by a distance that depends on relative misalignment of the first and second reflector systems. The return reflector returns the first combined beam to the beam splitter. After reflection from the return reflector, the first and second beams have the same number of reflections from the respective first and second reflector system as the first and second beams had before reflection from the return reflector.

In particular, the beam splitter again separates, directs the beams into corresponding reflector systems, and then recombines the returning first and second beams to form a second combined beam. The first and second beams are collinear in the second combined beam.

The return reflector can be a plane mirror that is perpendicular to the first combined beam. In this case, the first and second beams retrace their original paths to exactly undo the walk-off. As a result, the second combined beam exits along an axis of the input beam. Separation optics can separate the second combined beam from the input beam to avoid conflicts between delivery of the input beam and measurement of the combined beam. In one embodiment, the separation optics includes a beam splitter that passes the input beam and reflects the output beam. Alternatively, the separation optics include a birefringent prism and a polarization-rotating element.

The return reflector can alternatively be an optical element or system that receives an incident beam and returns a parallel reflected beam that is offset from the incident beam. The offset is fixed so that a shift in the incident beam causes a matching shift of the reflected beam. Examples of return reflector that provide reflections with the desired properties include but are not limited to an isosceles prism having a reflective base, a plane mirror and a transparent isosceles prism, and a trapezoid prism. With this type of return reflector, the second combined beam is offset from the input beam, but the first and second beams still have no walk-off in the combined beam.

Another embodiment of the invention is an interferometer employing an isosceles prism that returns beams to conventional interferometer optics to eliminate beam walk-off. During a first pass of light through the interferometer optics, the interferometer optics split an input beam into a reference beam and a measurement beam. The measurement beam reflects from a measurement reflector that may be subject to misalignment. The optics recombine the reference and measurement beams into a first recombined beam in which the reference and measurement beams are parallel but subject to walk-off that depends on the alignment of the measurement reflector. The isosceles prism returns the first recombined beam to the optics where the optics separate the reference beam and the measurement beam from the first recombined beam, reflects the measurement beam from the measurement reflector, and then recombines the first and second beams into a second recombined beam in which the reference and measurement beams are collinear. In one specific configuration, the first recombined beam is incident on one of the equal-length facets of the isosceles prism, preferably at the center of the facet, and a base of the isosceles prism is perpendicular to the first recombined beam.

Another embodiment of the invention is a method for operating an interferometer. The method includes directing an input beam into the interferometer for a first pass through interferometer optics, reflecting the first and second beams to produce first and second returning beams that are directed back for a second pass through the interferometer optics, and measuring a combined beam that emerges from the interferometer optics as a result of the second pass. During the first pass, the interferometer optics splits the input beam into a first beam and a second beam and causes one of the first and second beams to reflect at least once from a reflector mounted on an object being measured. The first pass ends with the first and second beams exiting the interferometer optics along paths that are parallel and have a non-zero walk-off from each other. The first and second returning beams are parallel to the first and second beams and are respectively offset from the first and second beams by a fixed distance that can be greater than or equal to zero.

A plane mirror return reflector reflects the first and second exiting beams to direct the first and second returning beams with zero offset back along respective paths of the first and second exiting beams. The second pass then retraces the path followed for the first pass, and the final combined beam exits along the axis of propagation of the input beam.

For a non-zero offset between the input and output beams, the first returning beam is parallel to and offset from the first exiting beam, and the second returning beam is parallel to and offset from the second returning beam. Systems including an isosceles prism or a trapezoid prism can reflect the first and second exiting beams to direct the first and second returning beams back with the desired offset for the second pass. The final combined beam will be offset from the input beam and free of beam walk-off.

BRIEF DESCRIPTION OF THE DRAWINGS

Use of the same reference symbols in different figures indicates similar or identical items.

DETAILED DESCRIPTION

In accordance with an aspect of the invention, an interferometer has a passive optical system that returns measurement and reference beams for additional passes through interferometer optics to eliminate beam walk-off in the final output beam. In one embodiment, the returned beams exactly retrace their respective paths to exit as collinear beams that coincide with the input beam. For this embodiment, a plane mirror perpendicular to the output path of a conventional interferometer can return reference and measurement beams for the retracing. Alternatively, the returning reference and measurement beams can be parallel to but offset from the original output paths. An optical element such as an isosceles prism can return the beams with the desired direction and offset.

Figure 2:
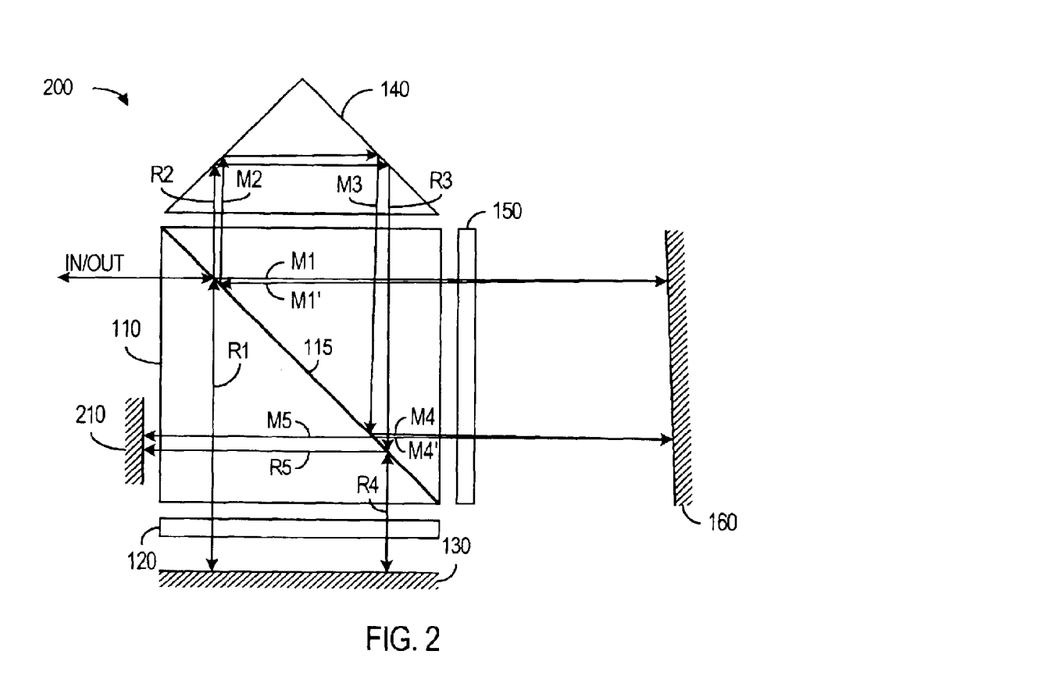
FIG. 2 shows an embodiment of the invention that eliminates walk-off using a reflector that returns measurement and reference beams to retrace their respective paths.

FIG. 2 shows a plan view of optical elements of an interferometer 200 in accordance with an embodiment of the invention. As illustrated, interferometer 200 contains optics including a polarizing beam splitter 110, quarter-wave plates 120 and 150, a reference reflector 130, a cube corner reflector 140, and a measurement reflector 160, which can be of conventional design.

Interferometer 200 receives an input beam along a path IN/OUT. Interferometer 200 can either be a DC interferometer in which the input beam is preferably monochromatic or an AC interferometer in which the input beam is preferably a beam containing two orthogonally polarized components having slightly different frequencies. DC and AC interferometers are well known in the art. For illustrative purposes, an exemplary embodiment of the invention in which interferometer 200 is an AC interferometer is described below. A DC interferometer would, however, have beam paths identical to those described below and differs from an AC interferometer in the nature of the input beam and the processing of the combined output beam to measure movement of an object.

In an AC interferometer, each frequency component of the input beam has a linear polarization that is orthogonal to the linear polarization of the other frequency component. Current beam sources can provide a heterodyne beam with frequency components having polarizations that are highly, if not perfectly, linear and orthogonal. A Zeeman split laser with appropriate polarizing optical elements can generate an input beam having the desired properties.

In the exemplary embodiment of the invention, the source of the input beam is a commercially available laser head such as a 5517D available from Agilent Technologies, Inc. The 5517 family of laser heads applies an axial magnetic field to the laser cavity of a He—Ne laser to cause the Zeeman splitting. Zeeman splitting in this manner generates a beam containing frequency components with a frequency difference f2–f1 of about 2 to 6 MHz and an average wavelength of about 633 nm. The two frequency components from the laser cavity have opposite circular polarizations, and a quarter-wave plate or other optical system converts the circular polarizations of the frequency components into orthogonal linear polarizations.

The beam source, e.g., the laser, is generally kept away from the interferometer optics to avoid thermal effects on the measurement system, and an optical system using fiber optics or direct beam transmission can deliver the input beam from the beam source to the interferometer optics along path IN/OUT. The linear polarizations of the delivered frequency components are along the separation axes of polarizing beam splitter 110.

Polarizing beam splitter 110 receives the input beam and splits the input beam into components according to linear polarization. In the exemplary embodiment of the invention, beam splitter 110 has a square cross-section and includes two prisms with an intervening beam splitter coating 115 at 45° with each face of beam splitter 110. Alternatively, a different geometry or a polarizing beam splitter containing a birefringent material might be used. Beam splitter 110 ideally provides total extinction of the light having the one linear polarization from the transmitted beam and total extinction of the light having the other linear polarization from the reflected beam, but some leakage of the wrong polarization will generally be present.

To provide a definite example, the following description refers to the component of the input beam that is initially reflected from beam splitter coating 115 as a reference beam and refers to the initially transmitted component as a measurement beam. Alternatively, the reflected beam could be the measurement beam, and the transmitted beam could be the reference beam.

In FIG. 2, the reference beam upon reflection from beam splitter coating 115 follows a path R1 through quarter-wave plate 120 to reference reflector 130. Reference reflector 130 in the illustrated embodiment is a plane mirror mounted on the same structure as beam splitter 110. The plane mirror is perpendicular to path R1 and therefore reflects the reference beam back along path R1. Traveling down and back along path R1 through quarter-wave plate 120 effectively rotates the polarization of the reference beam by 90°, and the reference beam passes through beam splitter coating 115 to path R2.

The reference beam traveling path R2 reflects from cube corner reflector 140 and exits cube corner reflector 140 along an offset path R3 back to beam splitter 110. From path R3, the reference beam passes through beam splitter coating 115 to a path R4. The reference beam traverses path R4 through quarter-wave plate 120 to reference reflector 130, reflects from reference reflector 130 and returns along path R4 back through quarter-wave plate 120 into polarizing beam splitter 110. The reference beam then reflects from beam splitter coating 115 to a path R5 leading to a return reflector 210.

Path R5 corresponds to the output path ROUT in the conventional interferometer 100 of FIG. 1. In interferometer 200, return reflector 210 is a plane mirror that is aligned perpendicular to path R5 and therefore returns the reference beam to retrace path R5 back into polarizing beam splitter 110. Returning on path R5, the reference beam retraces paths R5, R4 (in both directions), R3, R2, and R1 (in both directions) to exit along path IN/OUT. The directions shown in FIG. 2 for the paths of the reference beam (and the measurement beam) are the directions corresponding to a first pass through the interferometer optics, and the directions of the reference beam after reflection from return reflector 210 are opposite to those illustrated in FIG. 2.

The component of the input beam transmitted through the beam splitter coating 115 at first incidence forms the measurement beam. The measurement beam then follows a path M1 through quarter-wave plate 150 to measurement reflector 160. Measurement reflector 160 is of the same type as reference reflector 130 and in interferometer 200, is a plane mirror that is nominally aligned perpendicular to path M1. Measurement reflector 160 is mounted on an object such as a translation stage that is being measured and is generally subject to variation in angular orientation. FIG. 2 shows measurement mirror 160 as out of ideal alignment. With the illustrated misalignment of the plane mirror, measurement reflector 160 reflects the measurement beam to path M1', which is at an angle with path M1.

Traveling twice through quarter-wave plate 120 along paths M1 and M1' effectively rotates the polarization of the measurement beam by 90°. At its second incidence on beam splitter coating 115, the measurement beam reflects from beam splitter coating 115 to path M2. If measurement reflector 160 were perfectly aligned to path M1, paths M1 and M1' would coincide, and paths M2 and R2 would coincide. With the illustrated misalignment, paths R2 and M2 are skewed and offset from each other.

The measurement beam traveling path M2 reflects from cube corner reflector 140 and exits cube corner reflector 140 along an offset path M3 back to beam splitter 110. From path M3, the measurement beam reflects from beam splitter coating 115 to a path M4. The measurement beam traverses path M4 through quarter-wave plate 150 to measurement reflector 160 and reflects from measurement reflector 160 onto path M4'. The measurement beam then returns along path M4' back through quarter-wave plate 150 into polarizing beam splitter 110.

The polarization changes from traversing quarter-wave plate 150 twice cause the measurement beam on path M4' to pass through beam splitter coating 115 to a path M5 leading to return reflector 210. Measurement path M5 (like path M4') is parallel to reference path R5 because cube corner reflector 140 makes path M3 parallel to path M2 and the second reflection from reference reflector 160 undoes the angular variation originating from the first reflection from measurement reflector 160.

Path M5 corresponds to the output path MOUT in the conventional interferometer optics of FIG. 1. Return reflector 210 returns the measurement beam to retrace paths M5, M4', M4, M3, M2, M1' and M1 and exit polarizing beam splitter 110 along path IN/OUT. The output measurement beam is thus collinear with the output reference beam and on the same axis as the input beam. Since the measurement beam retraces its path through the interferometer optics, the return pass undoes any effects of the yaw or pitch variation of measurement reflector 160. Similarly, if reference reflector 130 were misaligned, returning the reference beam to retrace its path through the interferometer optics undoes any beam walk-off that misalignment of reference reflector 130 might have otherwise caused.

Another feature of interferometer 200 is that the measurement beam reflects from measurement reflector 160 four times. Accordingly, the Doppler shift in the frequency of the output measurement beam is twice that of the conventional interferometer 100 of FIG. 1, effectively doubling the measurement resolution. Conventional electronic systems that measure the Doppler shift in the beat frequency of a combined beam and then calculate the movement that caused the shift can be adapted for the larger Doppler shifts.

The second pass of the measurement and reference beams through interferometer 200 after return reflector 210 causes attenuation or loss of optical power. However, the optical power in the beam overlap, which provides the measured signal, will be constant and generally greater than the power from the worst case beam overlap provided in a conventional interferometer such as illustrated in FIG. 1. Accordingly, interferometer 200 can use a lower power beam source and use receiver electronics with less dynamic range than conventional interferometers may require.

Figure 3A:
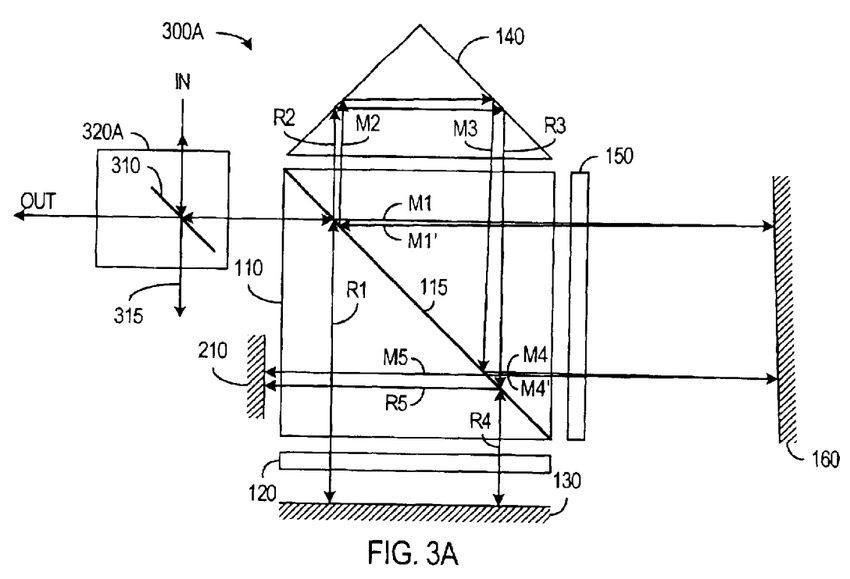
FIGS. 3A and 3B show interferometer optics for embodiments of the invention having alternative systems for separating input and output beams.

Having the combined output beam along the same axis as the input beam generally requires some system to avoid blocking the input beam when directing the output beam into a receiver for the measurement electronics. FIG. 3A illustrates an interferometer 300A including an input/output separation system 320A that employs a beam splitter 310 (e.g., a half silvered mirror) to separate the output beam from the input beam. Beam splitter 310 receives the input beam and reflects a portion of the input beam into polarizing beam splitter 110. A remainder 315 of the input beam is transmitted through beam splitter 310 and lost if the remainder 315 cannot be directed to another use such as for measurements along another axis in a multi-axis interferometer. Beam splitter 310 also receives the recombined beam output from polarizing beam splitter 110, transmits part of the recombined beam for measurement, and reflects a part, which is lost.

Figure 3B:
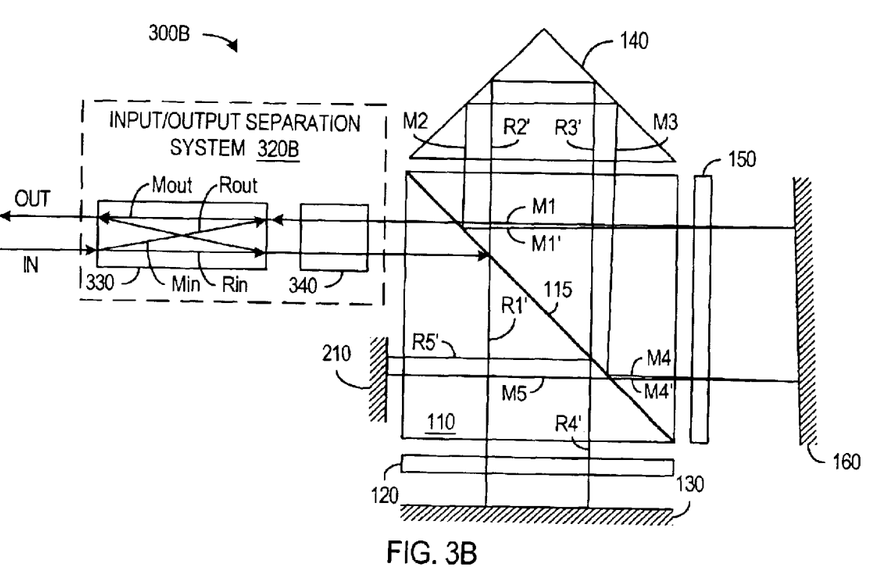

FIG. 3B illustrates an interferometer 300B including an input/output beam separation system 320B that redirects the output beams to a path offset from the input beam path. In the embodiment of FIG. 3B, beam separation system 320B includes a birefringent prism 330 and a polarization-rotating element 340.

The input beam for interferometer 300B is the same as the input beam for interferometer 200 of FIG. 2, except for the directions of the linear polarizations. The frequency components of the input beam for interferometer 300B have linear polarizations that are aligned with the birefringence axes of prism 330 and at an angle such as 45° with the axes of polarizing beam splitter 110.

Birefringent prism 330, which can be a calcite beam displacer such as commercially available from suppliers such as Karl Lambrecht, receives the input beam and separates a polarization component Min that corresponds to the measurement beam from a polarization component Rin that corresponds to the reference beam. The polarization components Min and Rin exit prism 330 offset from each other.

Polarization rotating element 330, which can be a quarter-wave Faraday rotator, rotates the polarizations of beams Min and Rin by a fixed angle, i.e., 45°, so that beams Min and Rin have linear polarizations corresponding to the axes of polarizing beam splitter 110.

The measurement beam Min follows paths M1, M1', M2, M3, M4, M4', and M5 and then reflects from return mirror 210 to retrace paths M5, M4', M4, M3, M2, M1', and M1 as described above. Polarizing beam splitter 110 thus outputs the measurement beam along the same axis along which the measurement beam entered polarizing beam splitter 110.

The reference beam follows paths R1', R2' (in both directions), R3', R4' (in both directions), and R5' and then reflects from mirror 210 to retrace paths R5', R4' (in both directions), R3', R2', and R1' (in both directions). The reference paths R1', R2', R3', R4', and R5' of FIG. 3 differ from the reference paths R1, R2, R3, R4, and R5 of FIG. 2 because the input reference beam Rin of FIG. 3B is offset from the input beam in FIG. 2. Polarizing beam splitter 110 thus outputs the reference beam along the same axis along which the reference beam Rin entered polarizing beam splitter 110.

The measurement and reference beams exit polarizing beam splitter 110 offset from each other by a distance equal to the offset that prism 330 created. This offset differs from an offset corresponding to beam walk-off because the offset in interferometer 300B is fixed and independent of variations in the orientations of measurement reflector 160 or reference reflector 130.

Polarizing element 340 again rotates the polarizations of the output beams by 45°. The entry and exit trips through polarizing element 340 rotate the polarizations of the measurement and reference beams by 90° so that birefringent prism 330 deflects the measurement beam and transmits the reference beam. The output reference and measurement beams exit along an output path OUT that is separated from the input path IN, and therefore more easily directed into measurement devices without blocking the input beam.

Figure 4A:
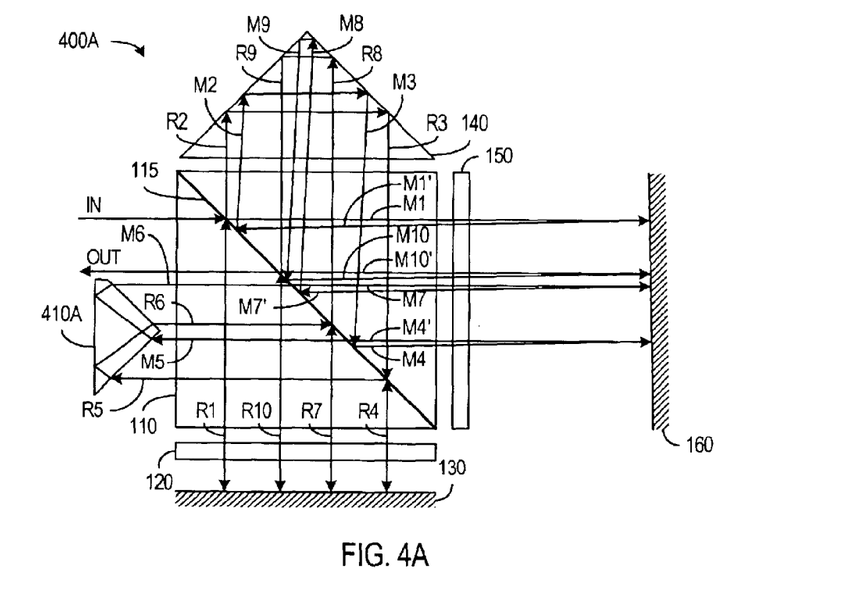
FIGS. 4A, 4B, and 4C show alternative embodiments of the invention that eliminate beam walk-off using optical elements that return and offset measurement and reference beams.

In accordance with another aspect of the invention, a reflector that returns the measurement and reference beams for an additional pass through the interferometer optics can offset the returned beams. FIG. 4A shows interferometer 400A including a return reflector 410A that provides a reflected beam that is offset from the incident beam.

Interferometer 400A uses a beam source (not shown) and an input beam that are substantially identical to the beam source and input beam described above for interferometer 200 of FIG. 2. On a first pass through the interferometer optics, the reference beam and the measurement beam follow the same paths as described above in regard to FIG. 2. In particular, the reference beam traverses paths R1 (in both directions), R2, R3, R4 (in both directions), and R5 before reaching return reflector 410. The measurement beam traverses paths M1, M1', M2, M3, M4, M4', and R5 before reaching return reflector 410.

Return reflector 410 reflects the incident reference beam from path R5 to an offset path R6 back to polarizing beam splitter 115 and reflects the incident measurement beam from path M5 to an offset path M6 back to polarizing beam splitter 115. For any measurement or reference beam incident on return reflector 410 the reflected beam has a direction opposite the direction of the incident beam and is offset from the incident beam by the same distance regardless of the position of the incident beam. A plane mirror perpendicular to the incident beams has these properties for the limiting case of an offset distance equal to zero.

In interferometer 400A, return reflector 410 has optical faces acting as an isosceles prism 410 with a reflective base perpendicular to the incident reference and measurement beams. Isosceles prisms 410A are easily constructed with as a triangular prism with internal angles 90°, 45°, and 45°. The base of isosceles prism 410A can be coated with a highly reflective coating, or isosceles prism 410A may alternatively have a sufficiently high refractive index to provide total internal reflection at the base when light is incident on either of the other sides along a direction perpendicular to the base. The position and orientation of isosceles prism 410A in FIG. 4A is such that measurement and reference beams are incident on the same face of isosceles prism 410A for a full range of tolerated beam walk-off distance. The reference beam is preferably incident at the center of the face.

Figure 4B:
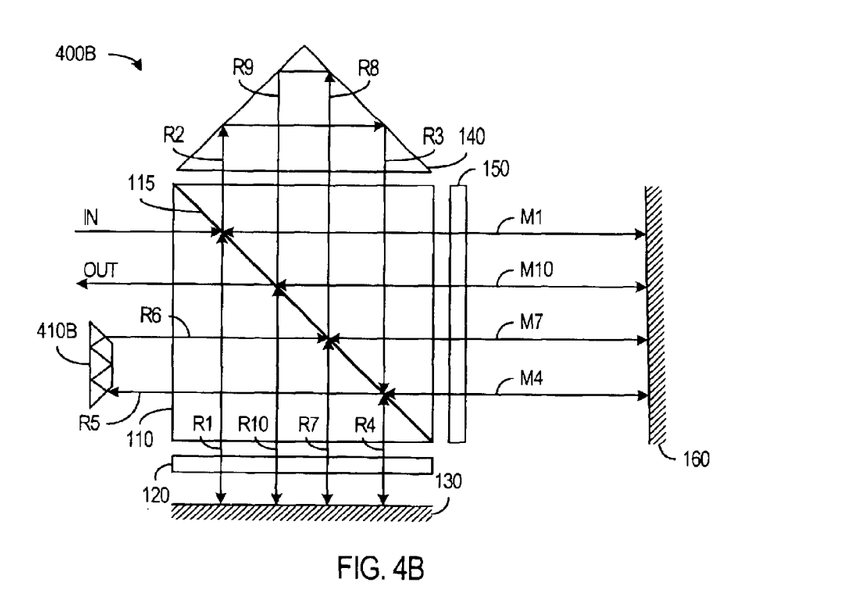

FIG. 4B illustrates an alternative interferometer 400B that is identical to interferometer 400A of FIG. 4A except that the return reflector 410 in interferometer 400B is a trapezoid prism 410B. Trapezoid prism 410B has a reflective base and a reflective top that are perpendicular to the incident measurement and reflective beams. The reference and measurement beams are incident on one of the slanted faces of trapezoid prism 410B, enter trapezoid prism 410B and reflect at least once from the base and top of the prism before exiting through the opposite slanted face. The slanted facets have the same lengths and are at the same angles with the base of trapezoid prism 410B. Trapezoid prism 410B performs in substantially the same manner as isosceles prism 410A, but provides a relatively larger offset. Additionally, the top of trapezoid prism being flat allows prism 410B to be bonded directly to polarizing beam splitter 110.

Figure 4C:
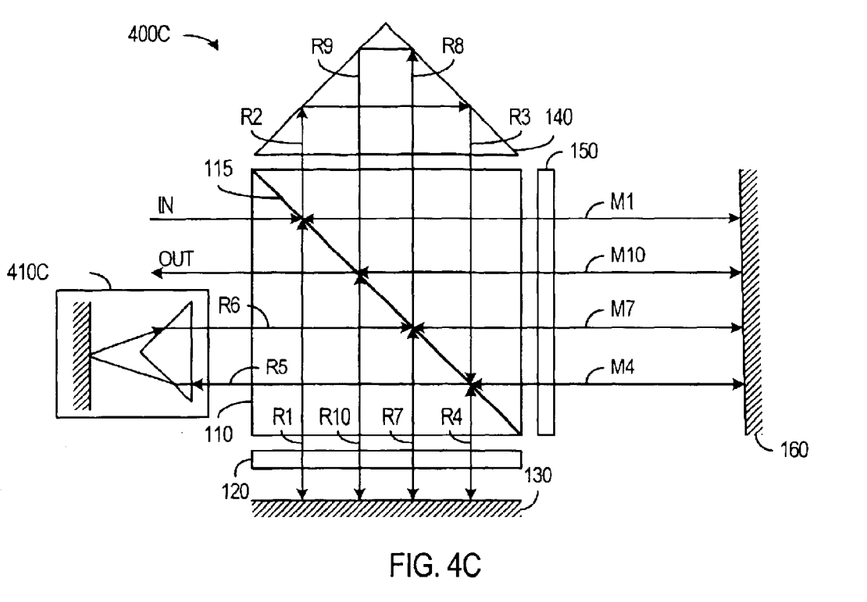

FIG. 4C illustrates yet another alternative interferometer 400C according to an embodiment of the invention in which a return reflector 410C includes an isosceles prism with its base toward polarizing beam splitter 110. The apex of the isosceles prism in return reflector 410C is towards a plane mirror. A combined beam incident on the base of the isosceles prism is refracted upon exiting the isosceles prism, reflects from the plane mirror, and is refracted upon re-entering the isosceles prism. Return reflector 410C returns the reflected beam along a path parallel to and offset by a fixed distance from the path of the incident beam.

FIGS. 4A, 4B, and 4C illustrate specific optical elements 410A, 410B, and 410C for return reflectors that return incident measurement and reference beams along return paths that are parallel to corresponding incident paths and that shift the return paths to match any shift in the incident paths. More generally, return reflectors 410A, 410B, and 410C and other optical systems can implement the required properties of a return reflector and are referred to generically herein as return reflectors 410. Each of FIGS. 4A, 4B, and 4C also shows a configuration where a return reflector 410 provides a horizontal offset that is in a plane containing the reference paths when the interferometer has the ideal alignment. Alternatively, the orientation of the return reflector 410 can provide an offset at an angle with the plane containing the reference paths and particularly a vertical offset that is perpendicular to the plane of the reference beams. In the views illustrated, the reference and measurement beams if returned with a vertical offset would appear to exactly retrace their first pass through the interferometer optics.

For the horizontal offset, the returned reference beam follows paths R6, R7 (in both directions), R8, R9, and R10 (in both directions) before reflecting from beam splitter coating 115 onto an output path OUT. The returned measurement beam follows paths M6, M7, M7', M8, M9, M10, and M10' before passing through beam splitter coating 115 to output path OUT. The output measurement and reference beams will be collinear on output path OUT provided that the optical surfaces (e.g., beam splitter coating 115, quarter-wave plates 120 and 150, cube corner 140, and reflectors 130 and 160) are spatially uniform and the normal to the reflective surface of return reflector 410 is parallel to beam paths M5 and R5. The output path OUT being separated from the input path IN facilitates measuring the combined beam without blocking with the input beam.

Figure 5:
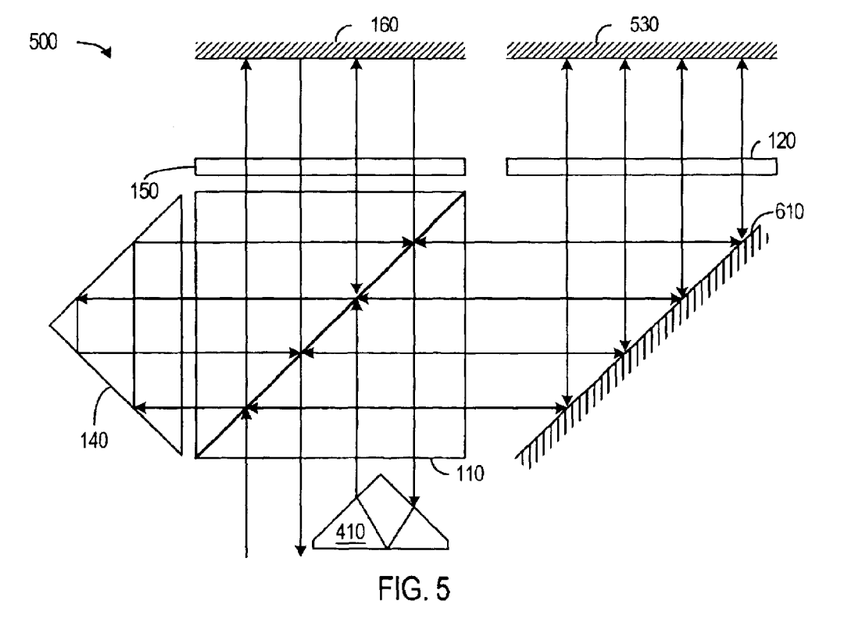
FIG. 5 illustrates a differential plane-mirror interferometer in accordance with an embodiment of the invention.

Aspects of the invention can be applied to many interferometer configurations. FIG. 5 shows a differential interferometer 500 as another exemplary embodiment of the invention. Differential interferometer 500 measures the difference in the positions of a first object on which a measurement reflector 160 is mounted and a second object on which a reference reflector 530 is mounted. Interferometer 500 of FIG. 5 differs from interferometer 400 of FIG. 4A predominantly in that reference reflector 530 (with an associated folding mirror 510) replaces the fixed reference reflector 130 as illustrated in FIG. 4A.

Beam paths illustrated in FIG. 5 are the paths followed when reflectors 160 and 530 and other optical elements of interferometer 500 are ideally aligned. However, in differential interferometer 500, both reflectors 160 and 530 maybe subject to independent angular variations that would cause beam walk-off in a conventional differential interferometer. Differential interferometer 500 uses the return reflector 410 to direct both measurement beams back for a second pass through the interferometer optics and thereby eliminates beam walk-off that misalignment of reflectors 160, 510, or 530 might otherwise cause.

Figure 6:
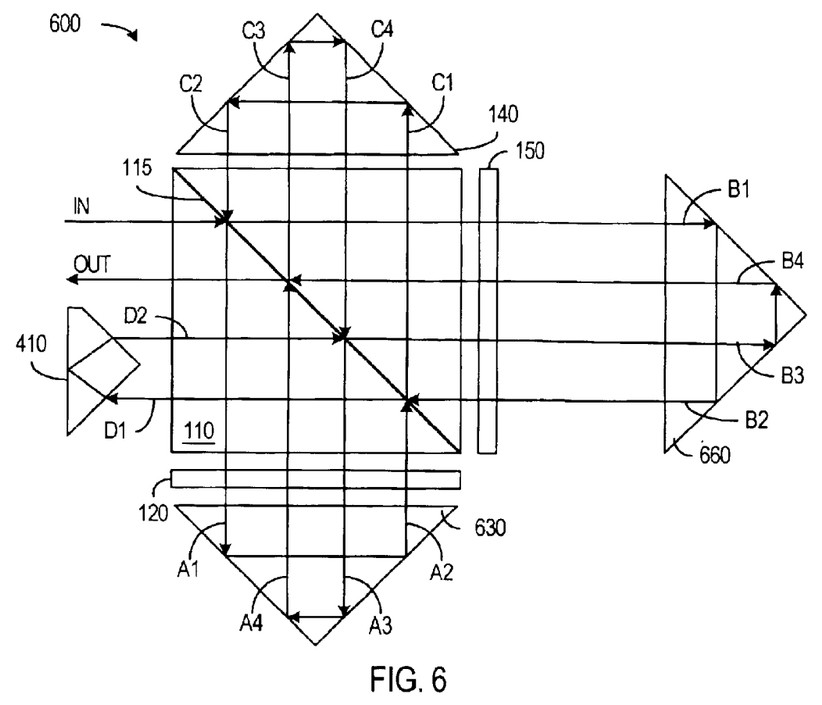
FIG. 6 shows an interferometer in accordance with an embodiment of the invention employing cube corner reflectors for reference and measurement reflectors.

FIG. 6 illustrates a multi-pass linear interferometer 600 in which a reference reflector 630 and a measurement reflector 660 are retroreflectors such as cube corner reflectors. Retroreflectors 630 and 660 replace plane mirror reflectors 130 and 160 of interferometer 400A (FIG. 4A), but interferometer 600 otherwise contains the same elements as described above in reference to FIG. 4A.

Retroreflectors return an incident beam along a reflected path that is parallel to but offset from the incident path. Accordingly, the paths of the reference and measurement beams in interferometer 600 differ from the paths in interferometer 400. With the ideal alignment of interferometer 600, the reference beam traverses paths A1, A2, C1, C2, A1, A2, and D1 on a first pass through the interferometer optics. Return reflector 410 then returns the reference beam to follow paths D2, A3, A4, C3, C4, A3, A4, and OUT. With the ideal alignment, the measurement beam traverses paths B1, B2, C1, C2, B1, B2, and D1 on a first pass through the interferometer optics. Return reflector 410 then returns the measurement beam to follow paths D2, B3, B4, C3, C4, B3, B4, and OUT.

The amount of the offset that a cube corner provides depends on the distance of the incident beam from the vertex of the cube corner, and the ideal alignment requires alignment of the vertex of measurement reflector 660 relative to the vertex of reference reflector 630. If the vertices of reflectors 630 and 660 are not properly aligned with each other, the reflected measurement path B2 will not be incident on beam splitter coating 115 at the same point where reflected reference path A2 is incident on beam splitter coating 115. As a result, one of the reference or measurement beams will be offset from path D1, which causes beam walk-off for conventional interferometers. Interferometer 600 eliminates this walk-off by returning the measurement and reference beams for another pass through the interferometer optics, and on the second pass, the misalignment causes an offset that cancels the offset created during the first pass. Interferometer 600 thus eliminates the beam walk-off.

Figure 7:
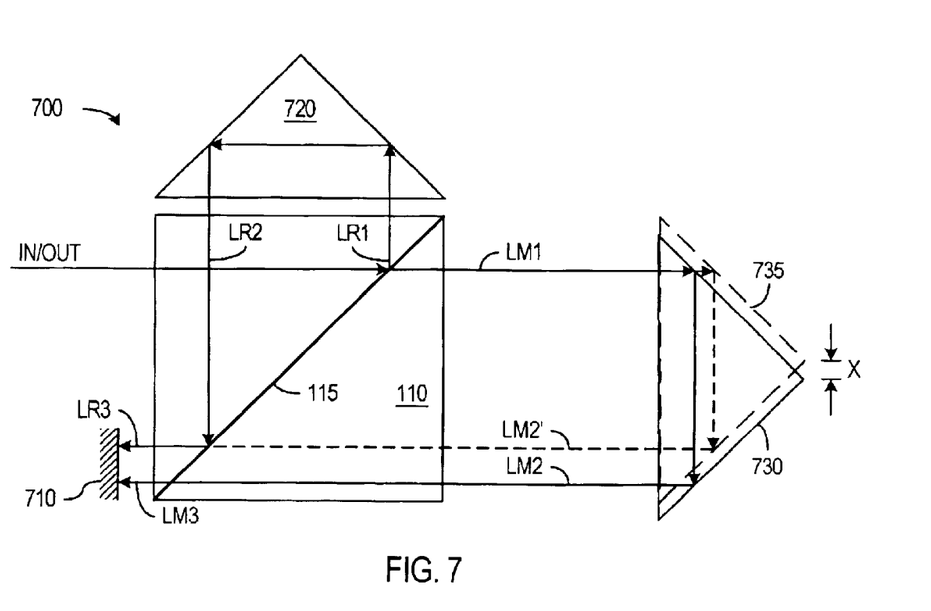
FIG. 7 illustrates a linear interferometer in accordance with an embodiment of the invention employing a plane mirror as a return reflector that directs reference and measurement beams to retrace paths through the interferometer.

FIG. 7 shows an interferometer 700 in accordance with yet another embodiment of the invention. Interferometer 700 is a linear interferometer that includes a polarizing beam splitter 110, a reference reflector 720, and a measurement reflector 730. As with the other embodiments of the invention, linear interferometer 700 can employ a monochromatic input beam or a two-frequency input beam that includes two orthogonal linear polarization components having slightly different frequencies. Polarizing beam splitter 110 splits an input beam received along path IN/OUT into a first polarization component that reflects from beam splitter coating 115 to form a reference beam and a second polarization component passes through beam splitter coating 115 to form a measurement beam.

During a first pass through the interferometer optics, the reference beam reflects from the input beam onto a path LR1 leading to reference reflector 720. Reference reflector 720 is a retroreflector such as a cube corner reflector and reflects the reference beam from path LR1 onto an offset path LR2 having the opposite direction from reference beam LR1. The reference beam on path LR2 reflects from beam splitter coating 115 onto a path LR3 to return reflector 710.

The measurement beam during a first pass through the interferometer optics passes through beam splitter coating 115 onto a path LM1 to measurement reflector 730. Measurement reflector 730, like reference reflector 720, is a retroreflector. If measurement reflector 730 is in a position 735 that is aligned to the position of reference reflector 720, the measurement beam exits measurement reflector 730 along a path LM2' and passes through beam splitter coating 115 onto path LR3. Accordingly, if reflectors 720 and 730 are properly aligned, the reference and measurement beams are collinear along path LR3 and could then be output as a combined beam for measurement of the movement of measurement reflector 730 along its axis.

If the measurement reflector 730 is offset from the ideal position 735, e.g., by a distance X as illustrated in FIG. 7, measurement reflector 730 reflects the measurement beam from path LM1 to path LM2, which is offset from the ideal measurement path LM2' by 2X. Accordingly, upon passing back through beam splitter coating 115, the measurement beam is on a path LM3 that is offset from reference path LR3 by a distance that depends on the misalignment distance X.

In a conventional linear interferometer, the distance between paths LM3 and LR3 is beam walk-off.

Return reflector 710 returns the measurement and reference beams for another pass through the interferometer optics so that the measurement and reference beams retrace their paths and exit as a collinear beam along axis IN/OUT. In FIG. 7, return reflector 710 is a plane mirror perpendicular to paths LR3 and LM3 so that the reference and measurement beams on a second pass through the interferometer optics retrace path LR3, LR2, and LR1 and LM3, LM2, and LM1, respectively. FIG. 7 illustrates paths LR1, LR2, LR3, LM1, LM2, and LM3 with directions corresponding to the first pass through the interferometer optics, and the beams during the second pass have directions opposite those illustrated in FIG. 7. The reference and measurement beams both exit along the input path IN/OUT, and walk-off is eliminated.

Figure 8:
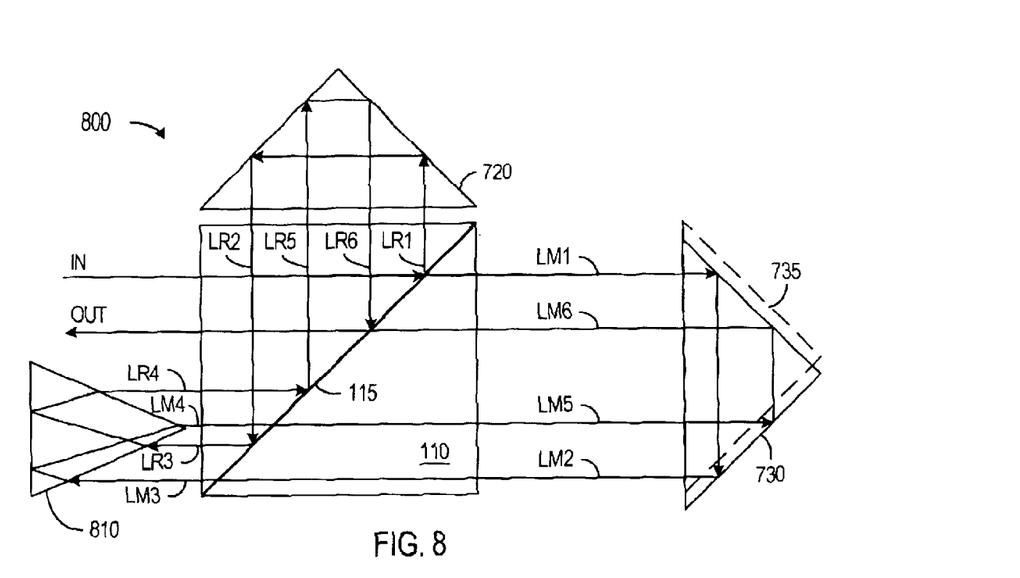
FIG. 8 illustrates a linear interferometer in accordance with an embodiment of the invention employing g return reflector that directs reference and measurement beams to retrace paths parallel to but offset from original paths through the interferometer.

FIG. 8 illustrates a linear interferometer 800 in which a return reflector 810 reflects and offsets the measurement and reference beams. In interferometer 800, the reference beam from input path IN follows paths LR1, LR2, and LR3 to return reflector 810 and returns from return reflector 810 along paths LR4, LR5, and LR6 to output path OUT. The measurement beam from input path IN follows paths LM1, LM2, and LM3 to return reflector 810 and returns from return reflector 810 along paths LM4, LM5, and LM6 to output path OUT. The output reference and measurement beams are thus collinear for most efficient combination and are offset from input path IN, which facilitates measuring the combined beam without blocking the input beam.

Figure 9:
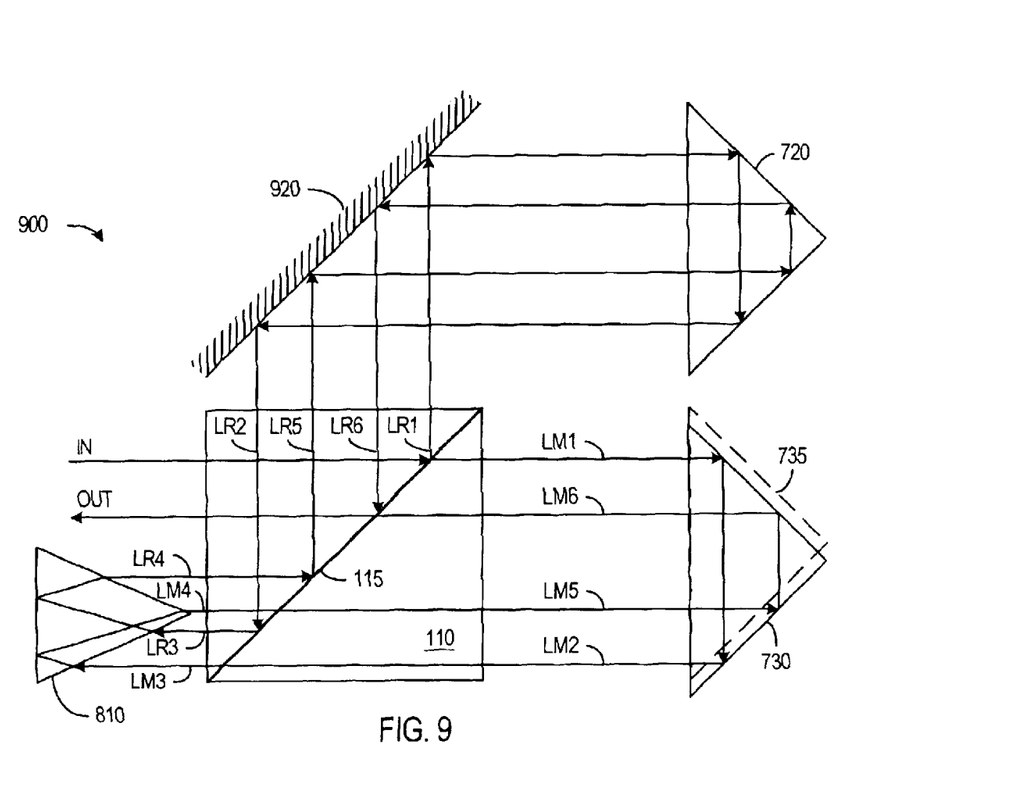
FIG. 9 illustrates a differential, linear interferometer in accordance with an embodiment of the invention.

FIG. 9 illustrates yet another alternative embodiment of the invention which is whieh-as a differential, linear interferometer 900. Interferometer 900 has reference reflector 720 mounted on an object instead of having a fixed mounting, and a reflector 920 directs the reference beam between polarizing beam splitter 110 and reference reflector 720. In interferometer 900, both reference reflector 720 and measurement reflector 730 can move and change the relative alignment of reflectors 720 and 730. However, return reflector 810 directs the reference and measurement beams for a second pass through the interferometer optics to eliminate beam walk-off that would otherwise arise.

Although the invention has been described with reference to particular embodiments, the description is only an example of the invention's application and should not be taken as a limitation. For example, although the above embodiments illustrate specific geometries for interferometers, embodiments of the invention can be more generally applied to other geometries and systems that need to eliminate beam walk-off. Additionally, although the above embodiments show interferometers having a single measurement axis, the same principles equally apply to multi-axes interferometers. Various other adaptations and combinations of features of the embodiments disclosed are within the scope of the invention as defined by the following claims.

What is claimed is:

1. An interferometer comprising:
   a beam splitter aligned to receive an input beam and separate the input beam into a first beam and a second beam;
   a first reflector system positioned to receive the first beam from the beam splitter, the first reflector system directing the first beam back to the beam splitter;
   a second reflector system positioned to receive the second beam from the beam splitter, the second reflector system directing the second beam back to the beam splitter, wherein the beam splitter forms a first combined beam from the first beam from the first reflector system and the second beam from the second reflector system, the first and second beams in the first combined beam being parallel to each other and walked-off from each other by a distance that depends on relative misalignment of the first and second reflector systems; and a return reflector positioned to return the first combined beam to the beam splitter, whereby the first beam and the second beam from the first combined beam are again separated and then recombined to form a second combined beam in which the first and second beams are collinear, wherein after reflection from the return reflector, the first beam retraces a path parallel to a path the first beam traveled in reaching the return reflector and the second beam retraces a path parallel to a path the second beam traveled in reaching the return reflector.

2. The interferometer of claim 1, wherein the return reflector comprises an isosceles prism having a base perpendicular to the first combined beam.

3. The interferometer of claim 1, wherein
the first reflector system comprises a first quarter-wave plate and a reference reflector; and
the second reflector system comprises a second quarter-wave plate and a measurement reflector, the measurement reflector being mounted on an object being measured by the interferometer.

4. The interferometer of claim 1, wherein:
the first reflector system comprises a first retroreflector; and
the second reflector system comprises a second retroreflector.

5. The interferometer of claim 1, further comprising a retroreflector positioned to receive the first and second beams from the beam splitter and return the first and second beams to the beam splitter, wherein between the input beam and the first combined beam, the first beam returns to the beam splitter from the first reflector system twice and the second beam returns to the beam splitter from the second reflector system twice.

6. The interferometer of claim 1, wherein the interferometer is a linear interferometer.

7. The interferometer of claim 1, wherein the interferometer is a plane-mirror interferometer.

8. The interferometer of claim 1, wherein the interferometer is a differential interferometer.

9. An interferometer comprising:
a beam splitter aligned to receive an input beam and separate the input beam into a first beam and a second beam;
a first reflector system positioned to receive the first beam from the beam splitter, the first reflector system directing the first beam back to the beam splitter;
a second reflector system positioned to receive the second beam from the beam splitter, the second reflector system directing the second beam back to the beam splitter, wherein the beam splitter forms a first combined beam from the first beam from the first reflector system and the second beam from the second reflector system, the first and second beams in the first combined beam being parallel to each other and walked-off from each other by a distance that depends on relative misalignment of the first and second reflector systems; and a return reflector positioned to return the first combined beam to the beam splitter, whereby the first beam and the second beam from the first combined beam are again separated and then recombined to form a second combined beam in which the first and second beams are collinear wherein the return reflector comprises a plane mirror that is perpendicular to the first combined beam.

10. The interferometer of claim 9, the second combined beam is along an axis of the input beam.

11. The interferometer of claim 10, further comprising separation optics that separates the second combined beam from the input beam.

12. The interferometer of claim 11, wherein the separation optics comprises a birefringent prism and a polarization-rotating element.

13. An interferometer comprising:
a beam splitter aligned to receive an input beam and separate the input beam into a first beam and a second beam;
a first reflector system positioned to receive the first beam from the beam splitter, the first reflector system directing the first beam back to the beam splitter;
a second reflector system positioned to receive the second beam from the beam splitter, the second reflector system directing the second beam back to the beam splitter, wherein the beam splitter forms a first combined beam from the first beam from the first reflector system and the second beam from the second reflector system, the first and second beams in the first combined beam being parallel to each other and walked-off from each other by a distance that depends on relative misalignment of the first and second reflector systems;
a return reflector positioned to return the first combined beam to the beam splitter, whereby the first beam and the second beam from the first combined beam are again separated and then recombined to form a second combined beam in which the first and second beams are collinear; and
a retroreflector positioned to receive the first and second beams from the beam splitter and return the first and second beams to the beam splitter, wherein between the input beam and the second combined beam, the first beam returns from the first reflector system to the beam splitter four times and the second beam returns from the second reflector system to the beam splitter four times.

14. An interferometer comprising:
optics that split an input beam into a reference beam and a measurement beam and direct the measurement beam for at least one reflection from a measurement reflector on an object being measured, the optics recombining the reference and measurement beams into a first combined beam in which the reference and measurement beams are parallel but subject to walk-off that depends on the alignment of the measurement reflector; and
a return reflector positioned to receive the first combined beam and return the first combined beam to the optics, where the optics split the first combined beam into the reference beam and the measurement beam and direct the measurement beam for a least one reflection from the measurement reflector, the optics recombining the reference and measurement beams into a second combined beam in which the reference and measurement beams are collinear, wherein
the return reflector is such that shifting of an incident path of the first combined beam causes shifting of a reflected path of the first combined beam, and the shifting of the reflected path is identical in magnitude and direction to the shifting of the incident path.

15. The interferometer of claim 14, wherein the return reflector comprises an isosceles prism having a base and two equal-length facets, the isosceles prism being oriented so that the first combined beam is incident on one of the equal-length facets and the base is perpendicular to the first combined beam.

16. The interferometer of claim 14, wherein the return reflector comprises a trapezoid prism having a base, a top, and two equal-length facets, the trapezoid prism being oriented so that the first combined beam is incident on one of the equal-length facets and the base and top are perpendicular to the first combined beam.

17. The interferometer of claim 14, wherein the return reflector comprises:
an isosceles prism having a base and two equal-length facets, the isosceles prism being oriented so that the first combined beam is incident on the base; and
a plane mirror positioned so that combined beam after passing through the isosceles prism reflects from the plane mirror back into the isosceles prism.

18. A method for operating an interferometer comprising:
directing an input beam into the interferometer for a first pass through interferometer optics, wherein during the first pass, the interferometer optics splits the input beam into a first beam and a second beam and causes one of the first and second beams to reflect from a reflector mounted on an object being measured, the first pass ending with first and second exiting beams exiting the interferometer optics along paths that are parallel and have a non-zero walk-off from each other;
reflecting the first and second exiting beams to produce first and second returning beams that are directed back for a second pass through the interferometer optics, wherein the first and second returning beams are parallel to the first and second exiting beams, and the first and second returning beams are offset from the first and second beams, respectively, by a fixed distance; and
measuring a combined beam that emerges from the interferometer optics as a result of the second pass.

19. The method of claim 18, wherein a plane mirror reflects the first and second exiting beams to direct the first and second returning beams back along respective paths of the first and second exiting beams.

20. The method of claim 19, wherein the second pass retraces a path followed for the first pass, and the combined beam is along an axis of propagation of the input beam.

21. The method of claim 18, wherein the first returning beam is parallel to and offset from the first exiting beam, and the second returning beam is parallel to and offset from the second returning beam.

22. The method of claim 21, wherein an isosceles prism reflects the first and second exiting beams to direct the first and second returning beams back for the second pass.

23. A plane-mirror interferometer comprising:
a polarizing beam splitter positioned to split an input beam into a measurement beam and a reference beam;
a measurement reflector system including a plane mirror positioned to receive the measurement beam from the polarizing beam splitter;
a reference reflector system including a plane mirror positioned to receive the reference beam from the polarizing beam splitter;
a retroreflector; and
a return reflector that reflects an incident beam in a manner such that shifting the incident beam results in a matching shift of a reflected beam, the return reflector and the retroreflector being arranged so that;
the measurement beam enters and exits the measurement reflector system, enters and exits the retroreflector, and again enters and exits the measurement reflector system before encountering the return reflector and enters and exits the measurement reflector system, enters and exits the retroreflector, and again enters and exits the measurement reflector system after reflecting from the return reflector; and
the reference beam enters and exits the reference reflector system, enters and exits the retroreflector, and again enters and exits the reference reflector system before encountering the return reflector and enters and exits the reference reflector system, enters and exits the retroreflector, and again enters and exits the reference reflector system after reflecting from the return reflector.

24. The interferometer of claim 23, wherein:
the measurement reflector system further comprises a quarter-wave plate; and
the reference reflector system further comprises a quarter-wave plate.

25. The interferometer of claim 23, wherein the return reflector comprises an isosceles prism.

26. The interferometer of claim 25, wherein the isosceles prism has a reflective base that is perpendicular to the measurement and reference beams.

27. The interferometer of claim 25, wherein the measurement and reference beams are first incident on a base of the isosceles prism, and the return reflector further comprises a plane mirror from which the measurement and reference beams reflect after passing through the isosceles prism.

28. The interferometer of claim 23, wherein the return reflector comprises a trapezoid prism.

29. A linear interferometer comprising:
a polarizing beam splitter positioned to split an input beam into a measurement beam and a reference beam;
a measurement retroreflector positioned to receive the measurement beam from the polarizing beam splitter and reflect the measurement beam back to the polarizing beam splitter;
a reference retroreflector positioned to receive the reference beam from the polarizing beam splitter and reflect the reference beam back to the polarizing beam splitter; and
a return reflector positioned to receive and reflect the reference beam from the polarizing beam splitter after reflection from the reference retroreflector and to receive and reflect the measurement beam from the polarizing beam splitter after reflection from the measurement retroreflector, the return reflector operating to reflect an incident beam in a manner such that shifting the incident beam results in a matching shift of a reflected beam.

30. The interferometer of claim 29, wherein the return reflector comprises an isosceles prism.

31. The interferometer of claim 30, wherein the isosceles prism has a reflective base that is perpendicular to the measurement and reference beams.

32. The interferometer of claim 30, wherein the measurement and reference beams are first incident on a base of the isosceles prism, and the return reflector further comprises a plane mirror from which the measurement and reference beams reflect after passing through the isosceles prism.

33. The interferometer of claim 29, wherein the return reflector comprises a trapezoid prism.

* * * * *